United States Patent
Grindahl et al.

(10) Patent No.: US 7,633,893 B2
(45) Date of Patent: Dec. 15, 2009

(54) FIXED OFDM WIRELESS MAN UTILIZING CPE HAVING INTERNAL ANTENNA

(75) Inventors: Mervin L. Grindahl, Waseca, MN (US); Vladimir Z. Kelman, Eagan, MN (US); J. Eric Dunn, St. Paul, MN (US); Stuart A. Froelich, Plymouth, MN (US); Keith W. Barnes, Waseca, MN (US)

(73) Assignee: NextNet Wireless, Inc., Burnsville, MN (US)

( * ) Notice: Subject to any disclaimer, the term of this patent is extended or adjusted under 35 U.S.C. 154(b) by 539 days.

(21) Appl. No.: 11/097,506

(22) Filed: Apr. 1, 2005

(65) Prior Publication Data
US 2005/0186956 A1 Aug. 25, 2005

Related U.S. Application Data

(62) Division of application No. 09/694,766, filed on Oct. 23, 2000, now abandoned.

(60) Provisional application No. 60/161,107, filed on Oct. 22, 1999.

(51) Int. Cl.
*H04B 7/14* (2006.01)
(52) U.S. Cl. .................... 370/315; 370/329
(58) Field of Classification Search ........... 370/315, 370/329
See application file for complete search history.

(56) References Cited

U.S. PATENT DOCUMENTS

| | | | |
|---|---|---|---|
| 4,800,559 A | 1/1989 | Florea et al. | |
| 5,282,222 A | 1/1994 | Fattouche et al. | |
| 5,425,050 A | 6/1995 | Schreiber et al. | |
| 5,436,902 A | 7/1995 | McNamara et al. | |
| 5,444,697 A | 8/1995 | Leung et al. | |
| 5,475,735 A | 12/1995 | Williams et al. | |
| 5,550,579 A | 8/1996 | Martinez | |
| 5,574,783 A | 11/1996 | Dunn | |
| 5,828,650 A | 10/1998 | Malkamaki et al. | |

(Continued)

FOREIGN PATENT DOCUMENTS

CA 2064975 9/1993

(Continued)

OTHER PUBLICATIONS van de Beek et al., "On Synchronization in OFDM Systems Using the Cyclic Prefix," Div. of Signal Processing, Luleå University of Technology, Sweden, not dated, pp. 105.

(Continued)

*Primary Examiner*—Jason E Mattis

(57) ABSTRACT

A fixed wireless access system generally comprises a consumer premise equipment (CPE) unit, that is connected via an Ethernet interface to a personal computer or local area network, and a base station unit that is connected via an Ethernet interface to a network. As such, the CPE unit is preferably easily user-installed while the base station unit is preferably tower-mounted within a 1-5 mile range of the CPE unit. Both the CPE unit and base station unit preferably incorporate an integrated data transceiver/switch that enables a radio frequency air link operating in the 2.5-2.686 GHz range. Orthogonal frequency division multiplexing is used in the uplink and downlink transmissions between CPE units and base station units.

18 Claims, 11 Drawing Sheets

U.S. PATENT DOCUMENTS

| | | | |
|---|---|---|---|
| 5,828,660 | A | 10/1998 | Baum et al. |
| 5,838,728 | A | 11/1998 | Alamouti et al. |
| 5,864,549 | A | 1/1999 | Honkasalo et al. |
| 5,867,478 | A | 2/1999 | Baum et al. |
| 5,867,485 | A | 2/1999 | Chambers et al. |
| 5,889,759 | A | 3/1999 | McGibney |
| 5,889,816 | A | 3/1999 | Agrawal et al. |
| 5,894,478 | A | 4/1999 | Barzegar et al. |
| 5,914,933 | A | 6/1999 | Cimini et al. |
| 5,933,421 | A | 8/1999 | Alamouti et al. |
| 5,943,396 | A | 8/1999 | Terashima et al. |
| 5,953,311 | A | 9/1999 | Davies et al. |
| 5,966,376 | A | 10/1999 | Rakib et al. |
| 5,970,397 | A | 10/1999 | Klank et al. |
| 5,973,642 | A | 10/1999 | Li et al. |
| 6,028,853 | A | 2/2000 | Haartsen |
| 6,046,701 | A | 4/2000 | Carey et al. |
| 6,046,992 | A | 4/2000 | Meier et al. |
| 6,084,867 | A | 7/2000 | Meier |
| 6,115,354 | A | 9/2000 | Weck |
| 6,128,276 | A | 10/2000 | Agee |
| 6,188,895 | B1 * | 2/2001 | Schmitz et al. ........... 455/426.2 |
| 6,246,875 | B1 | 6/2001 | Seazholtz et al. |
| 6,359,938 | B1 | 3/2002 | Keevill et al. |
| 6,496,862 | B1 | 12/2002 | Akatsu et al. |
| 6,535,918 | B1 * | 3/2003 | Bender et al. ............... 709/228 |
| 2001/0041539 | A1 * | 11/2001 | Juntunen et al. ............ 455/67.7 |
| 2004/0009760 | A1 * | 1/2004 | Laybourn et al. ........... 455/405 |
| 2005/0100120 | A1 * | 5/2005 | Barton et al. ............... 375/347 |

FOREIGN PATENT DOCUMENTS

| | | |
|---|---|---|
| CA | 2238680 | 11/1999 |
| DE | 19840020 A1 | 8/1999 |
| EP | 0 783 221 B1 | 7/1997 |
| EP | 0812085 A1 | 10/1997 |
| GB | 2 139 709 A | 11/1984 |
| WO | WO 96/20462 | 7/1996 |
| WO | 9627962 | 9/1996 |
| WO | 9748191 | 12/1997 |
| WO | WO 98/26520 | 6/1998 |
| WO | WO 98/35463 | 8/1998 |
| WO | 9903302 | 1/1999 |
| WO | WO 99/45672 | 9/1999 |
| WO | WO 99/62230 | 12/1999 |

OTHER PUBLICATIONS

Li et al., "Robust Channel Estimation for OFDM Systems with Rapid Dispersive Fading Channels," IEEE Transactions on Communications, 1998, pp. 902-915.

Landström, et al. "Time and Frequency Offset in OFDM Systems Employing Pulse Shaping," Proceedings of IEEE International Conference on Universal Personal Communication, San diego, California, Oct. 1997, pp. 279-283.

van de Beek et al., Low-Complex Frame Synchronization in OFDM Systems, Div. of Signal Processing, Luleå University of Technology, Sweden, not dated, 5 pages.

Speth, et al., "Optimum Receiver Design for Wireless Broad-Band Systems Using OFDM—Part 1," IEEE Transactions on Communications, Nov. 1999, pp. 1668-1677, vol. 47, No. 11.

Kim et al., "The AT&T Labs Broadband Fixed Wireless Field Experiment," IEEE Communications Magazine, Oct. 1999, pp. 56-62.

Nguyen et al., "Attenuation and Interference Measurements Conducted by Bell Atlantic to Investigate the Effect on an Operational Multichannel Multipoint Distribution Service (MMDS)," Bell Atlantic Network Systems Engineering, Arlington, Virginia, IEEE Transactions on Communications, 1996, pp. 88-91.

Bingham, "Multicarrier Modulation for Data Transmission: An Idea Whose Time Has Come," IEEE Communications Magazine, May 1990, pp. 5-14.

Erceg et al., "A Model for the Multipath Delay Profile of Fixed Wireless Channels," IEEE Journal on Selected Areas in Communications, Mar. 1999, pp. 399-409, vol. 17, No. 3.

Cimini, Jr., et al., "Orthogonal Frequency Division Multiplexing for Wireless Channels." AT&T Labs—Research Paper, not dated, 84 pgs.

Meyr et al., "Digital Communication Receivers; Synchronization, Channel Estimation, and Signal Processing," Wiley Series in Telecommunications and Signal Processing, J.G. Proakis, Series Editor, not dated, pp. 211-270.

"Handbook of Digital Signal Prcessing; Engineering Applications," Douglas F. Elliott, Editor, Academic Press, not dated, pp. 1-170.

"Digital Communications," Second Edition, John G. Proakis, Editor, McGraw-Hill, not dated, Chapters 4 & 5.

Fong, et al., "Radio Resource Allocation in Fixed Broadband Wireless Networks," IEEE Transactions on Communications, Jun. 1988, pp. 806-818, vol. 46, No. 6.

Vook et al., "Adaptive Antennas for OFDM, " $48^{th}$ IEEE Vehicular Technology Conference, Ottawa, Canda, May 18-21, 1998, pp. 606-610.

Perkins et al., "DHCP for Mobile Networking with TCP/IP," from Proceedings Symposium on Computers and Communications, 1995, pp. 255-261.

de Bot et al., "An Overview of the Modulation and Channel Coding Schemes Developed for Digital Terrestrial Television Broadcasting within the dTTb Project," International Broadcasting Convention, Sep. 16-20, 1994, Conference Publication No. 397, pp. 569-576.

Sandell et al., "Timing and Frequency Synchronization in OFDM Systems Using the Cyclic Prefix," Proceedings of International Symposium on Synchronization, Dec. 1995, Essen, Germany, pp. 16-19.

Lee et al., "A New Symbol Timing Recovery Algorithm for OFDM Systems," IEEEE Transactions on Consumer Electronics, Aug. 1997, pp. 767-775, vol. 43, No. 3.

Engels, et al., "Radio Access to an ATM Network with a TDD/TDMA-OFDM System," IEEE paper, Mar. 1997, pp. 1654-1658.

IEEE Std. 802.11-1997, "Part 11: Wireless LAN Medium Access Control (MAC) and Physical Layer (PHY) Specifications," 1997, 1 page.

Engels et al."Design of a 100 MBPS Wireless Local Area Network," URSI Symposium on Signals, Systems, and Electronics, 1998, Issue 98, pp. 253-256.

* cited by examiner

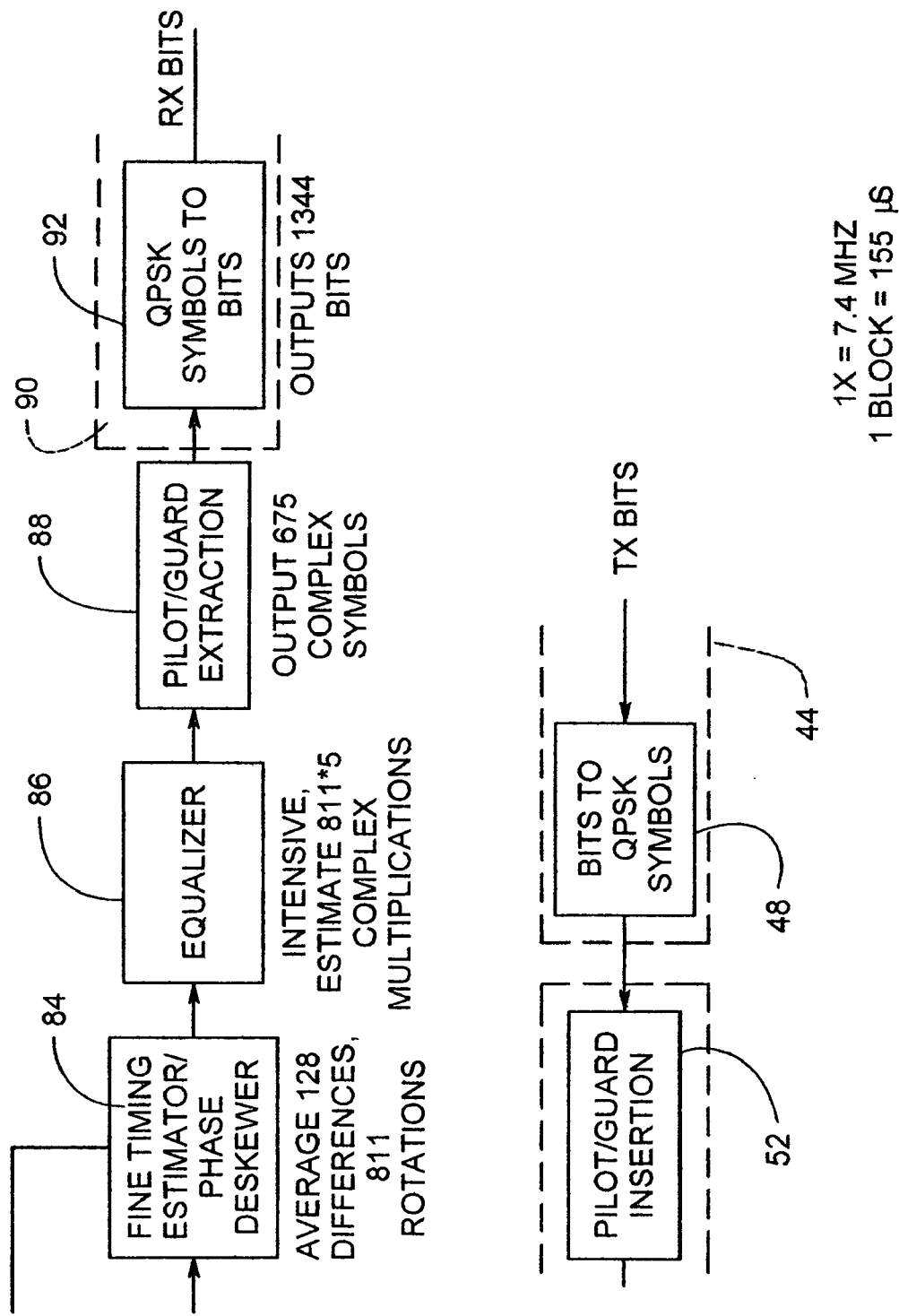

FIXED OFDM WIRELESS MAN UTILIZING CPE HAVING INTERNAL ANTENNA

CLAIM TO PRIORITY

The present application is a divisional of U.S. patent application Ser. No. 09/694,766 filed Oct. 23, 2000 and which claims priority to the co-pending U.S. Provisional Patent Application having Application No. 60/161,107, filed Oct. 22, 1999 and entitled "Fixed Wireless Access System."

FIELD OF THE INVENTION

The present invention relates generally to the field of wireless data communication systems. More specifically, the present invention relates to a fixed wireless metropolitan area network (MAN) that uses orthogonal frequency division multiplexing (OFDM) carrier access modulation configured to allow the consumer premise equipment (CPE) to utilize an antenna deployed internally within the consumer's premise, instead of requiring an externally accessible antenna that has a line of sight transmission path to a base station.

BACKGROUND OF THE INVENTION

Wireless data communication systems that utilize radio frequency (RF) signals to transmit and receive data are well known. Generally, wireless data communication technology has been applied to high performance long-distance communication systems such as satellite communications or microwave tower telecommunications, or to short-distance local area network (LAN) communication systems, such as a wireless LAN within a home or office environment. In the case of long-distance communication systems, a point-to-point antenna system is required and there must be a line-of-sight transmission path between the transmitter and the receiver. In the case of short-distance wireless LAN communication, an omni-directional antenna system can be utilized and a line-of-sight transmission path is not required because the distances are generally less than a mile. The reason for this difference is due to the fact that RF signals lose power rapidly over longer distances or when transmitting through obstacles such as buildings or walls.

A metropolitan area network (MAN) is a network that can communicate over medium-range distances of between about 1 to 40 miles as would be typically found in providing coverage over an entire metropolitan area. Digital subscriber loops (DSL) services are a good example of a wire-based MAN system that utilizes telephone wires as the communication medium. Cable modem systems are another example of a wire-based MAN system that utilizes coaxial cable as the communication medium. One of the primary advantages of a MAN system is that it allows for higher speed data communications as compared to conventional telephone modem speeds. The primary problem with such wire-based MAN systems is the cost of installing and maintaining the high-quality telephone or coaxial cable communication medium. A fixed wireless MAN system has the obvious advantage of eliminating the costs associated with installing and maintaining a wire based communication medium.

Another advantage of a fixed wireless MAN system is that the wireless communication medium can be designed to provide for higher data communications speeds than conventional wire-based MAN systems. This advantage has caused the fixed wireless MAN systems that have been deployed to date to be designed for ultra high performance and relatively expensive dedicated networks. The market for these fixed wireless MAN systems has been a small number of customers who have high-speed data communication needs that can justify the expense and complicated installation of such systems on an individual basis. As a result of the limited customer base and the need for ultra high performance, the designs of existing fixed wireless MAN systems have developed more along the lines of high performance long distance wireless communication systems.

While there are many factors to consider when designing RF communication systems, some of the more important factors to be considered in designing a fixed wireless MAN system are the assigned frequency, signal modulation and carrier access modulation. Assigned frequency refers to the range of frequencies or oscillations of the radio signal that are available to be used by the system. An example is the assigned band for AM radio signals which operate between 500 KHz and 1600 KHz. Signal modulation refers to the way in which information or data is encoded in the RF signal. An example is the difference between amplitude modulation (AM) radio signals and frequency modulation (FM) radio signals. Carrier access modulation refers to the way in which the assigned carrier frequencies are used to carry the RF signal. An example is the difference between using a single wide channel or multiple narrow channels over the same assigned frequency bandwidth.

For purposes of this invention, the design of a fixed wireless MAN system is focused on frequency ranges less than 10 GHz. Other medium-distance wireless communication systems have been developed, such as the local multipoint distribution system (LMDS) that operate at much higher frequency ranges, such as 28 GHz to 31 GHz. These higher frequencies are subject to different technical concerns and require larger external antenna systems that provide line-of-sight transmission paths from the top of one building to another.

Because of the desire for higher data speeds, all of the existing fixed wireless MAN systems have utilized more complicated schemes for signal modulation. To support faster speed downstream transmissions, these systems typically use a 16-bit quadrature amplitude modulation (QAM) or 64-bit QAM to transmit downstream from the base station to the CPE at a data rate of at least 10 Mbps.

Unlike the many fixed wireless LAN systems that have been developed for short-distance communications and use a spread spectrum form of carrier access modulation that spreads one signal across the assigned frequency bandwidth, the relatively few fixed wireless MAN systems that have been developed to date have utilized multi-carrier modulation as their carrier access modulation. In multi-carrier modulation, the signal is divided into several parallel data streams and these parallel data streams are simultaneously sent along different slower speed channels and then reassembled at the receiver to produce a higher effective transmission rate. The multi-carrier modulation scheme that has been designated by the IEEE standards committee to be used as the extension to the 802.11 wireless LAN standard for high-speed wireless data communications is known as orthogonal frequency division multiplexing (OFDM). The OFDM modulation scheme makes for a more efficient use of the assigned bandwidth and improves the ability to receive higher speed transmissions.

All of these more complicated modulation schemes for the existing fixed wireless MAN systems generally require more expensive equipment and more transmission power at each base station. To capitalize on the increased investment associated with each base station, existing fixed wireless MAN systems have been designed to minimize the number of base stations required to provide coverage for a given area. The radius of a typical coverage area for existing wireless man systems ranges between 10 to 30 miles.

Larger coverage areas are also used to minimize the need to reuse the same frequency channels in adjacent coverage areas. Because higher transmission powers are used to transmit at the higher data rates in all of the existing fixed wireless MAN systems, the higher power signals prevent the reuse of the same frequency channels in adjacent coverage areas and can even preclude the reuse of the same frequency channels at distances up to three to five times the radius of the coverage area. Consequently, larger coverage areas reduce the impact of problems caused by the inability to reuse frequencies in adjacent coverage areas.

The most significant disadvantage of larger sizes for the coverage area for each base station is the greater potential for signal loss or attenuation between the base station and the CPE. To counteract this potential signal loss over the larger distances and to improve reception at the higher power, higher transmission speeds, all of the existing fixed wireless MAN systems utilize a point-to-point antenna system that requires a line-of-sight transmission path between the base station and an externally accessible antenna that is connected to the CPE. For example, see the prior art fixed wireless MAN system configuration of FIG. 1 wherein the CPE within a single-user environment, e.g., a home, is connected to an antenna that is to the exterior of the single-user environment and where within a multi-user environment, e.g., a small office, each CPE is connected to its own antenna that is located exterior to the multi-user environment.

Given the relatively limited customer base and the need for all ultra high-performance that has dictated the development of existing fixed wireless MAN systems, the use of externally accessible antenna that provide a line-of-sight transmission path is both necessary and understandable. It will be desirable, however, to provide for a fixed wireless MAN system that does not require the use of an externally accessible antenna and could be more broadly deployed to provide higher data speeds more effectively to a larger number of consumers.

SUMMARY OF THE INVENTION

The needs described above are in large measure met by a fixed OFDM wireless MAN system of the present invention. The fixed wireless access system generally comprises a consumer premise equipment (CPE) unit that is connected via an Ethernet interface to a small office/home office personal computer or local area network, and a base station unit that is connected via an Ethernet interface to a network. The CPE unit is located in a premise for the home or small office, has an antenna that is deployed internally within that premise and is easily user-installed. The base station unit is preferably tower-mounted within a 1-5 mile range of the CPE unit. The CPE unit preferably incorporates an internal, integrated data transceiver/switch that allows it to receive a digital signal from a computer or network, transform that signal to an analog format, and transmit the analog signal via radio frequency technology, preferably operating in the 2.5-2.686 GHz range, to a base station unit. The base station unit preferably incorporates an integrated data transceiver/switch. Upon receiving the signal, the base station unit transforms the analog signal back to a digital signal and passes that signal through the Ethernet connection to the personal computer, LAN, and/or network. Orthogonal frequency division multiplexing is used in the uplink and downlink transmissions between CPE units and base station units.

The fixed wireless access system transmits utilizing OFDM signals that incorporate OFDM symbols. The OFDM symbols are presented without a training symbol and are detected in a symbol-by-symbol manner.

The fixed wireless access system utilizes a framed downlink transmission and an unframed uplink transmission.

BRIEF DESCRIPTION OF THE DRAWINGS

FIGS. 9A-9C depict, in block diagram format, the processing of a bit stream of a data package that is transmitted or received by radio frequency within the fixed wireless access system of the present invention.

DETAILED DESCRIPTION OF THE PREFERRED EMBODIMENTS

Figure 1:
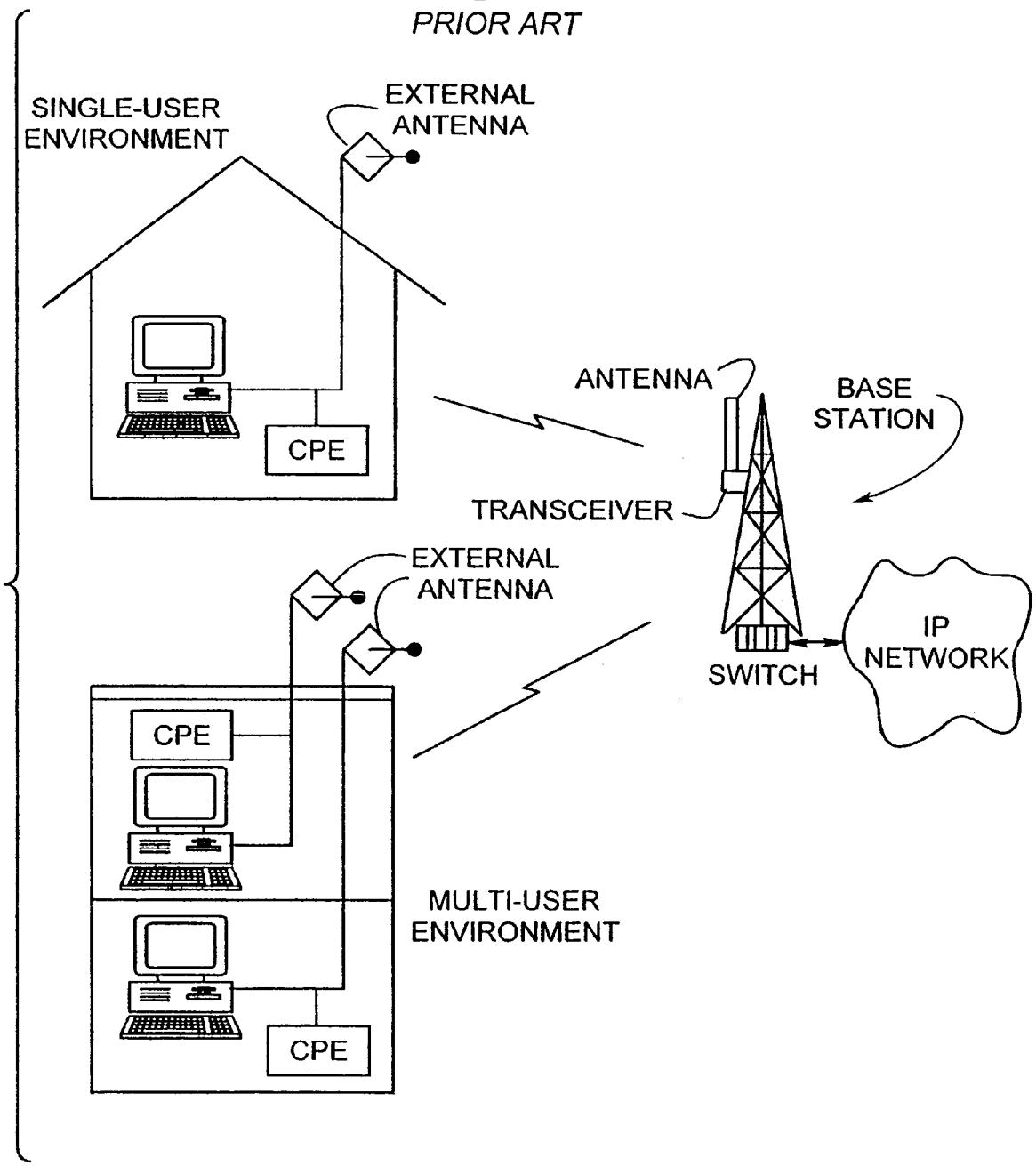
FIG. 1 provides an overview of a prior art fixed wireless MAN system utilizing external antennas.
Figure 2:
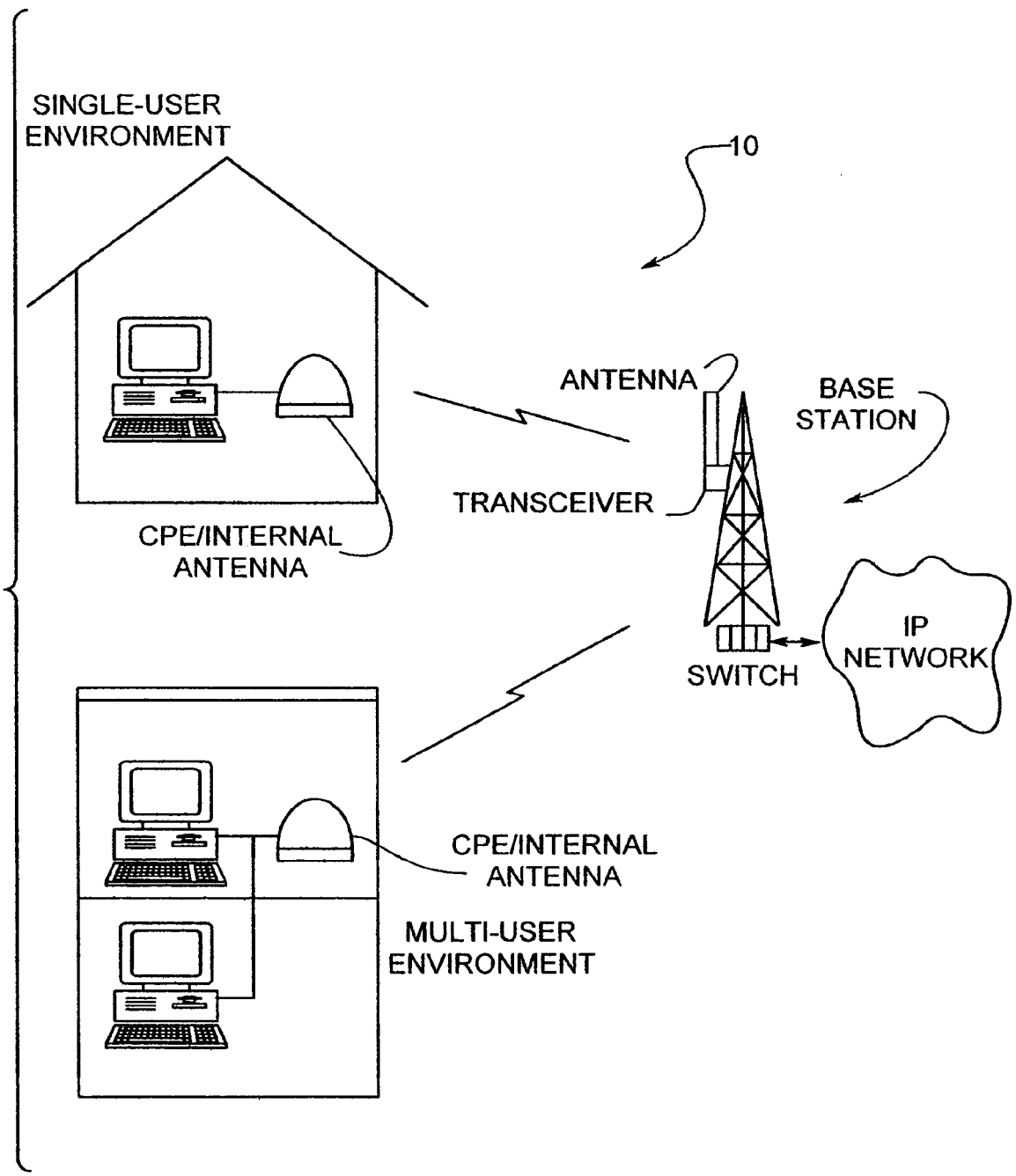
FIG. 2 provides an overview of a fixed OFDM wireless MAN system of the present invention utilizing internal antennas.

An overview of a fixed OFDM wireless metropolitan area network (MAN) with computer premise equipment (CPE) utilizing internal antennas of the present invention is shown in FIG. 2. As depicted, the fixed wireless access system 10 of the present invention may be configured for a single-user environment or a multi-user environment, e.g., a local area network. System 10 operates to transfer data from and to users of system 10 through use of high-reliability radio transmission technology. System 10 is especially applicable to the residential and small office/home office (SOHO) markets.

Figure 3:
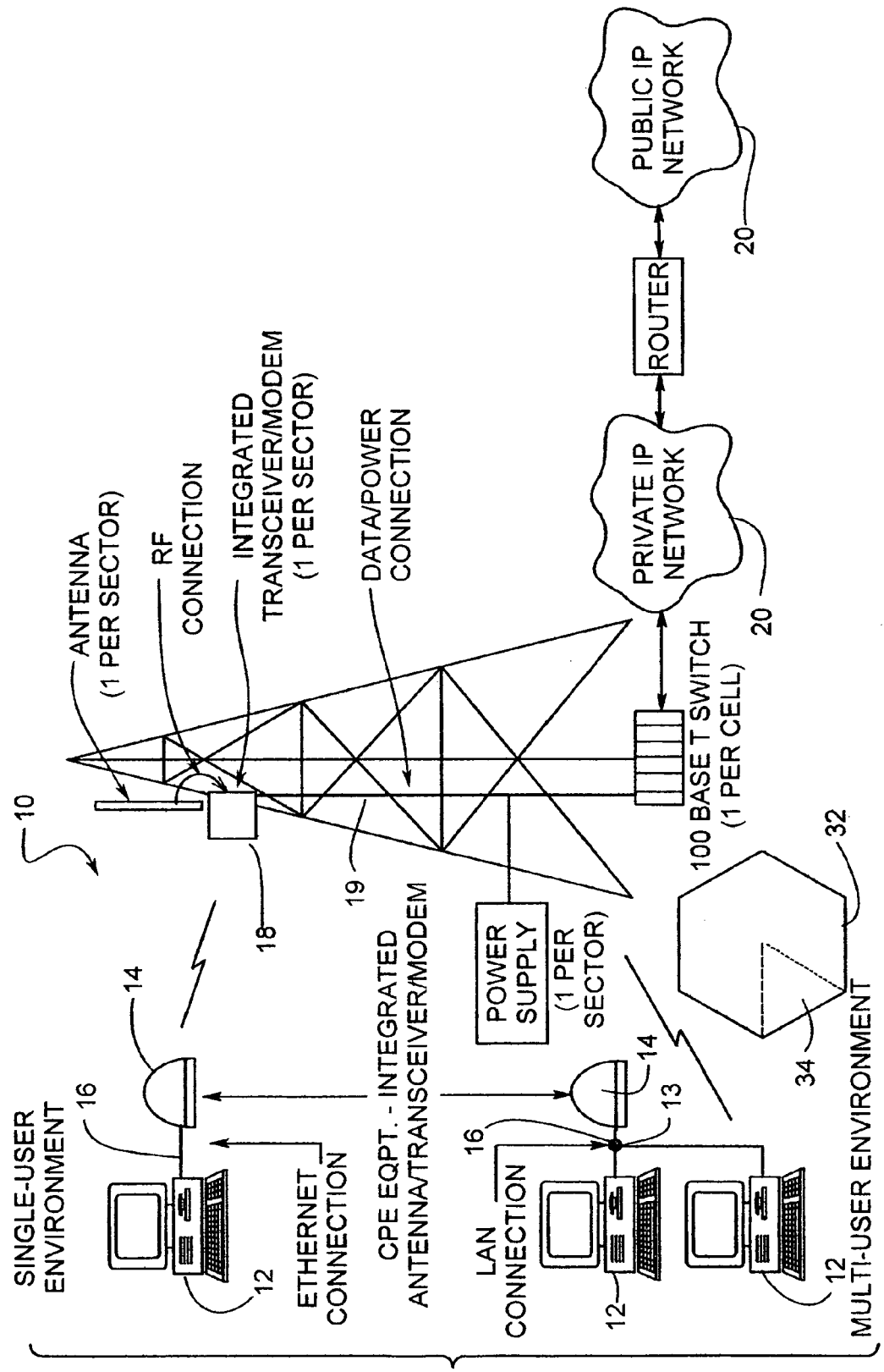
FIG. 3 depicts an overview of a single sector set-up within a cell of a fixed wireless access system of the present invention.

Referring now to FIG. 3, an overview of a single sector set-up within a cell of fixed wireless access system 10 is shown. As shown in FIG. 3, system 10 generally comprises one or more hosts, e.g., one or more host computers 12 and/or one or more local area network servers 13, which are connected to one or more customer premise equipment (CPE) units 14 via an Ethernet connection 16. Each CPE unit 14 communicates with one or more base station units 18 within system 10 via radio frequency. Each base station unit 18 is connected via an Ethernet interface 19 to one or more of various types of networks 19, or switching fabrics, e.g., asynchronous transfer modes (ATM).

I. System Components, Component Distribution and Component Recognition

Each CPE unit 14 incorporates hardware necessary to implement Ethernet communication with a user's personal computer 12 or LAN server, as well as radio frequency communication with base station units 18. That hardware is preferably implemented, at least in part, by use of field programmable gate array (FPGA) technology, or ASIC technology, and is preferably designed for a maximum power consumption of approximately 10 Watts. More specifically, each CPE unit 14 preferably incorporates an integrated data transceiver/switch and one or more Ethernet connectors, e.g., 10Base-T RJ45 connector (10BASE-T is a transmission medium specified by IEEE 802.3 that carries information at rates up to 10 Mbps in baseband form using twisted pair conductors, also called unshielded twisted pair (UTP) wire). With respect to the integrated data transceiver/switch, it should be noted that individual components may be used without departing from the spirit or scope of the invention.

For ease of CPE unit 14 installation, the integrated data transceiver/switch preferably incorporates an integral directional antenna that allows CPE unit 14 to be installed by a customer near an associated host computer 12 and within the customer's premise. The use of a standard Ethernet connector 22 further enhances the ease of installation of CPE unit 14 and allows CPE unit 14 to easily be user-installed for communication with their host computer 12 or local area network server 13. CPE unit 14 is preferably of a size and shape so that it may be positioned and/or mounted atop a desk, which again adds to the ease of a user installation.

Base station unit 18 incorporates hardware necessary to implement Ethernet communication with one or more of various types of networks 19, or switching fabrics, e.g., asynchronous transfer modes (ATM), as well as radio frequency communication with CPE units 14. That hardware is preferably implemented, at least in part, by use of FPGA technology or ASIC technology and is preferably designed for a maximum power consumption of approximately 100 Watts. More specifically, each base station unit 18, similar to each CPE unit 14, preferably incorporates an integrated data transceiver/switch and one or more Ethernet connectors, e.g., 10Base-T RJ45 connector. With respect to the integrated data transceiver/switch, it should be noted that individual components may be used without departing from the spirit or scope of the invention. Base station unit 18 is preferably additionally equipped with a global positioning system (GPS) receiver to provide a time reference, for system resolution and accuracy. A GPS time pulse is preferably used by system 10 to provide synchronization over the geographically distributed base station units 18 to avoid interference between base station units 18. With respect to the integrated data transceiver/switch, it should be noted that individual components may be used without departing from the spirit or scope of the invention.

As per FIG. 3, base station unit 18 is preferably tower-mounted to facilitate an expanded, non line-of-sight communication radius. The high system gain provided by the transmit levels, antenna gains, and receiver sensitivity allow for non line-of-sight operation of base station unit 18. If base station unit 18 is mounted at the bottom of the tower, an extended length of coaxial cable is required between base station unit 18 and its antenna. The longer coaxial cable run produces more loss in the system gain and will reduce the operational distance for a given level of non line-of-sight coverage.

Figure 4:
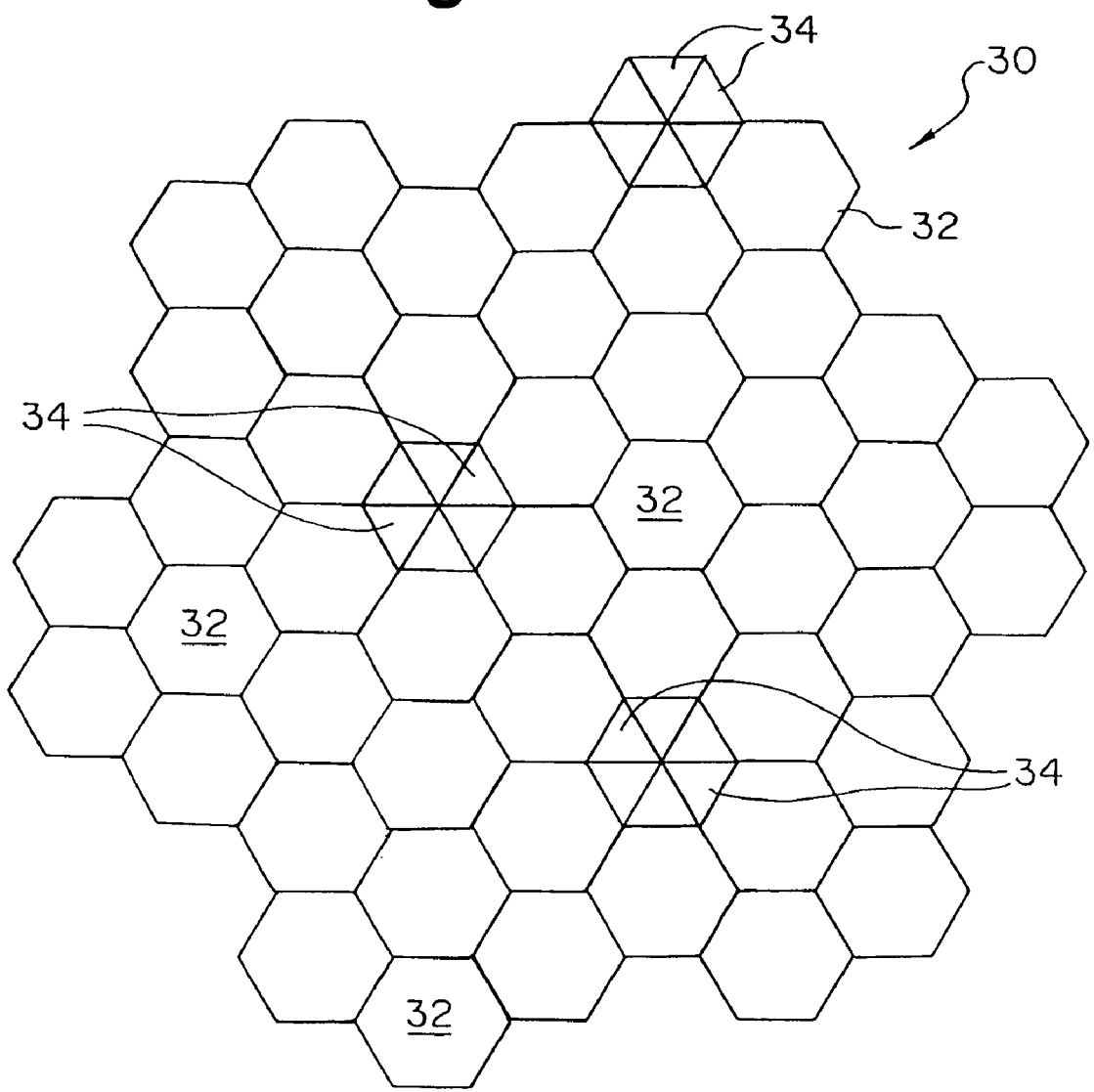
FIG. 4 depicts a cellular system of the present invention.

Each base station unit 18 is positioned per a distributed cellular system 30, see FIG. 4, wherein each cell 32 preferably includes one or more sectors 34, and each sector 34 preferably includes one base station unit 18. FIG. 4 is a diagram of an exemplary distributed cellular system 30 wherein each cell 32 has six sectors 34. Each cell 32 preferably has a communication radius of approximately 1 to 5 miles, with a typical radius of 3 miles. However, the use of a cellular, sectorized base station unit 18 deployment does not restrict the use of a single omni-directional base station unit 18. More specifically, it is not necessary to have a cell with multiple sectors to operate as a single cell operation. In the instance of a small geographic area, e.g., less than a three mile radius, where the potential user base is low and a single base station unit 18 could meet the data throughput capacity, a single base station could be installed with a high gain omni-directional antenna.

Once each CPE unit 14 and each base station unit 18 have been properly installed, each is capable of transmitting and receiving communication signals to and/or from each other. In the most basic of terms, the combined effect of radio frequency communication between CPE unit 14 and base station unit 18 is that of a standard Ethernet switch, with certain added enhancements. For example, radio frequency communication is facilitated between units 14 and 18 due to the fact that each CPE unit 14 and each base station unit 18 has been assigned a unique address, similar to an Ethernet switching system. Further, the radio frequency communication between units 14 and 18 preferably occurs in the form of a data packet which includes a source and/or destination address indicating which CPE unit 14 or base station unit 18 the communication signal is from and/or to, respectively, which again is similar to an Ethernet switching system. Broadcast traffic, e.g., traffic sent to all units within system 10, may also be communicated between base station units 18 and CPE units 14, similar to an Ethernet switching system.

Thus, just as an Ethernet switch enhances the operation of an Ethernet system, the switching configuration provided by CPE unit 14 and base station unit 18 operates to increase the performance of system 10 by allowing only essential traffic to travel between CPE units 14 and base station units 18; data packets are filtered or forwarded based upon their source and/or destination addresses without intervention by intermediate base station units 18, i.e., distributed switching. Further, like an Ethernet system, CPE unit 14 and base station unit 18 preferably implement dynamic host control protocol (DHCP), a protocol that is observed by CPE unit 14 and base station unit 18 to dynamically discover the low level physical network hardware address that corresponds to the high level internet protocol (IP) address of host computers 12 attached to a CPE unit 14.

More specifically, when a CPE unit first comes on-line, it begins to monitor for base station unit 18 signals through use of its transceiver. When CPE unit 14 detects a base station unit 18 signal of sufficient quality, CPE unit 14 registers with base station unit 18. Base station unit 18 uses an authentication server within network 20 to determine if CPE unit 14 is allowed and to determine how many host computers 12 may be attached to CPE unit 14. Base station unit 18 then either denies or acknowledges CPE unit 14 with the allowed number of host computers 12. Upon becoming registered with one of base station units 18, CPE unit 14 enters a learning phase whereby CPE unit 14 operates to learn the level 3 address and Ethernet physical layer address by observing traffic. The traffic observed is that of one of host computers 12 requesting a level 3 address from a server on the data communications network, i.e., LAN 13, and that of the response of the server, which is preferably in DHCP.

Upon observing traffic, CPE unit 14 creates a table of the attached host computer(s) level 3, IP address and the associated Ethernet low level physical network hardware address. In creating this table, CPE unit 14 is able to ensure that it will not transmit messages over the air link to base station unit 18 that have a level 3 address destination that corresponds to a host computer 12 that is already attached to CPE unit 14 via LAN 13 interface. Similar to CPE unit 14, base station unit 18 operates to observe traffic and create a table of the host computer(s) level 3, IP address, the associated Ethernet low level physical network hardware address, and the associated over-the-air hardware address of CPE unit 14. In creating this table base station unit 18 is able to ensure that that it will not transmit messages over the air link when the message includes a level 3 address destination that is not in the address table of base station unit 18.

Further, like an Ethernet system, CPE unit 14 and base station unit 18 preferably implement address resolution protocol (ARP), a protocol that is used by end devices, host computers and other computers attached to the network, to dynamically discover the Ethernet low level physical network hardware address of an attached host computer 12 that corresponds to the associated IP address of the said host computer 12.

However, unlike standard Ethernet systems, fixed wireless access system 10 provides for ARP proxy wherein one of base station units 18 may answer ARP requests intended for a host computer 12 attached to a CPE unit 14. By acting on behalf of a CPE unit 14, the intercepting base station unit 18 accepts responsibility for the routed data packet and may respond thereto, e.g., base station unit 18 may pass back the actual Ethernet MAC address of CPE unit 14. Of course, other and/or additional proxy protocols may be used without departing from the spirit or scope of the invention. By using ARP and ARP proxy, channel capacity may be conserved and the efficiency of system 10 increased, i.e., broadcast traffic over the air is reduced. Additionally, CPE unit 14 observes data traffic of the host computer(s) 12 that are attached to CPE unit 14. If the traffic is destined to another host computer 12 that is also attached to CPE unit 14, then CPE unit 14 does not transmit that traffic to base station unit 18, therefore channel capacity may be conserved and the efficiency of system 10 increased.

CPE unit 14 preferably incorporates a roaming function allowing the CPE unit 14 to be moved from a premise within the range of one base station unit 18 to a premise within the range of another, or to switch base stations 18 if one should go off the air. CPE unit 14 monitors the quality of all base station unit 18 signals and registers with a different base station unit 18 when the signal of the current base station unit 18 degrades below that of another base station unit 18. As with the original base station unit 18, when a change occurs CPE unit 14 registers with the new base station unit 18 and, additionally, passes the level 3 address and Ethernet physical layer address table of those host computers 12 connected to CPE unit 14 to the new base station unit 18 to enable proper synchronization of the tables between CPE unit and the new base station unit 18. The new base station 18 then performs gratuitous ARPs to cause table updating of the former base station unit 18 in order to speed the process of the base station units 18 properly switching traffic to CPE unit 14 for its associated host computers 12.

Moreover, a host computer 12 can be disconnected from one CPE unit 14 and connected to a different CPE unit 14. The new CPE unit 14 is then able to observe, via traffic, that another host computer 12 is active on its LAN 13 interface. The new CPE unit 14 then performs a registration with the added host computer 12 adding the level 3 address and Ethernet physical layer address of the added host computer 12 to its table. The base station unit 18 associated with the new CPE unit 14 then recognizes that a new host computer 12 has been added and operates to create a new entry in the base station unit address table for the new host computer 12. Base station unit 18 additionally performs a gratuitous ARP to update other base station units 18.

II. System Data Transmission

Fixed wireless access system 10 preferably operates in the 2.5-2.686 GHz instructional television fixed service/multipoint distribution service (ITFS/MDS) frequency range. The FCC licenses these frequencies as 31 channels, each with a 6 MHz bandwidth for two-way digital communication. In a recent order, the FCC has determined that channel licensees will be issued a blanket license thereby eliminating the need for each user to register their CPE unit 14 and eliminating the need for each base station unit 18 to be individually registered.

As indicated above, system 10 is preferably a cellular system 30 wherein each cell 32 in the system is divided into one or more sectors 34. One 6 MHz channel may be used to support a complete system by using a combination of cellular frequency reuse and a time division multiplex method. Alternatively, more than one 6 MHz channel may be used; adding more channels increases system 10 capacity for radio frequency communication capacity and throughput.

A preferred system 10, as shown in FIG. 4, utilizes a cellular system 30 wherein each cell 32 is divided into six sectors 34 and provided with six channels such that a sector 34 may use a channel all the time. In this preferred configuration, system 10 provides a 1:1 reuse pattern, a transmission rate of 9 Mbps per sector (54 Mbps per cell), and a data throughput rate of 3 Mbps per sector (18 Mbps per cell). Preferred system 10 is able to support approximately 300 simultaneous active users per sector (1800 per cell) and approximately 1000-1500 subscribers per sector (6000-9000 per cell). At a minimum system 10 is designed to support at least 250 simultaneous active users per sector.

Figure 5:
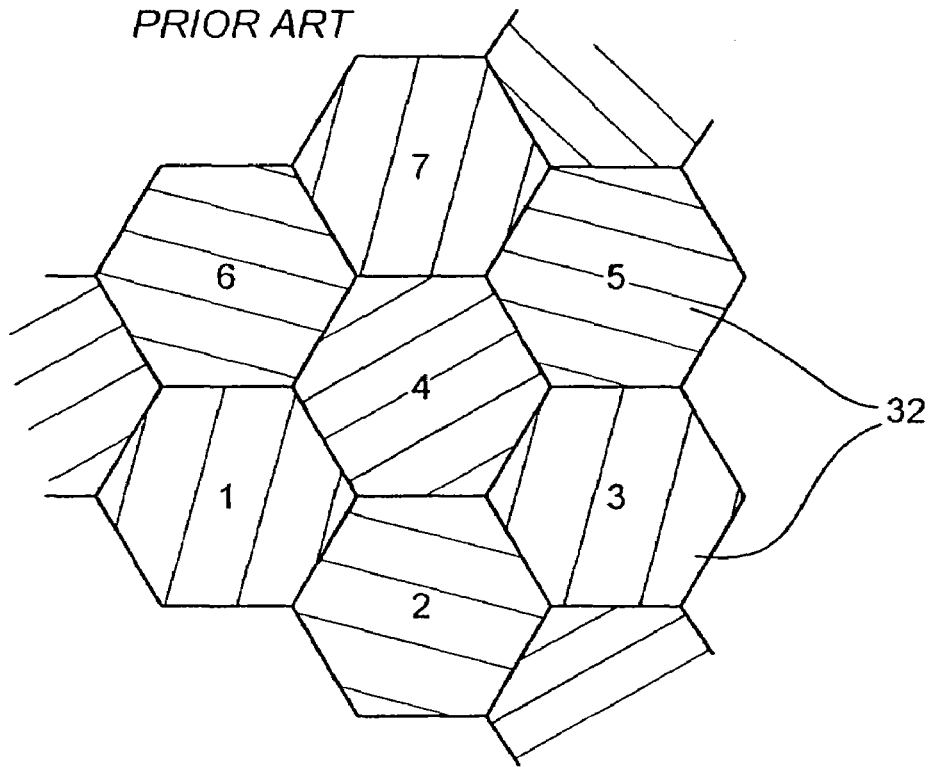
FIG. 5 depicts a standard, prior cellular re-use pattern.
Figure 6:
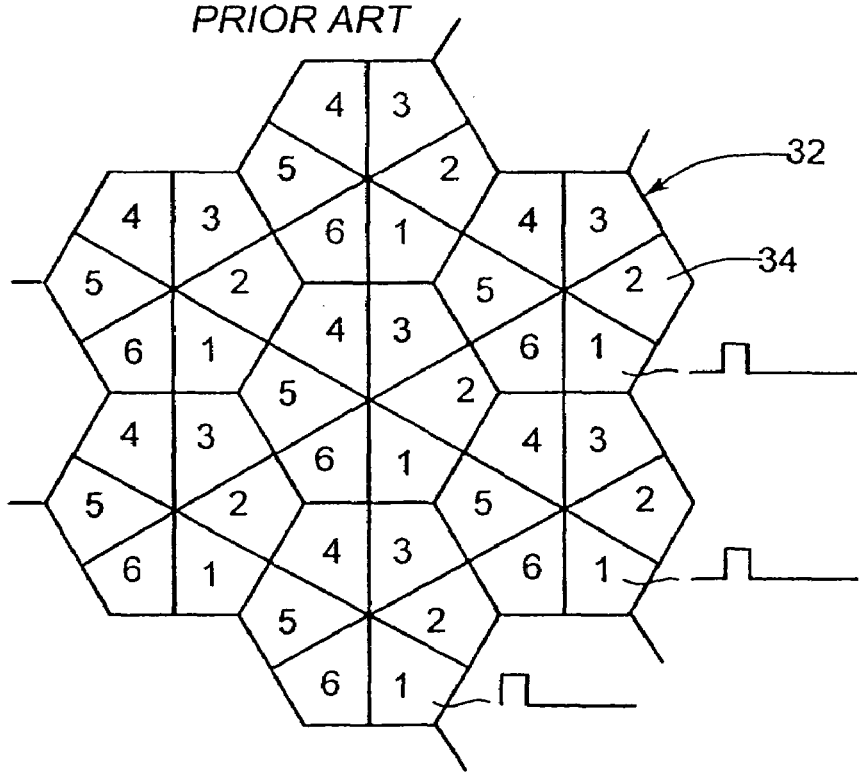
FIG. 6 depicts a prior art cellular re-use pattern utilizing TDMA.
Figure 7:
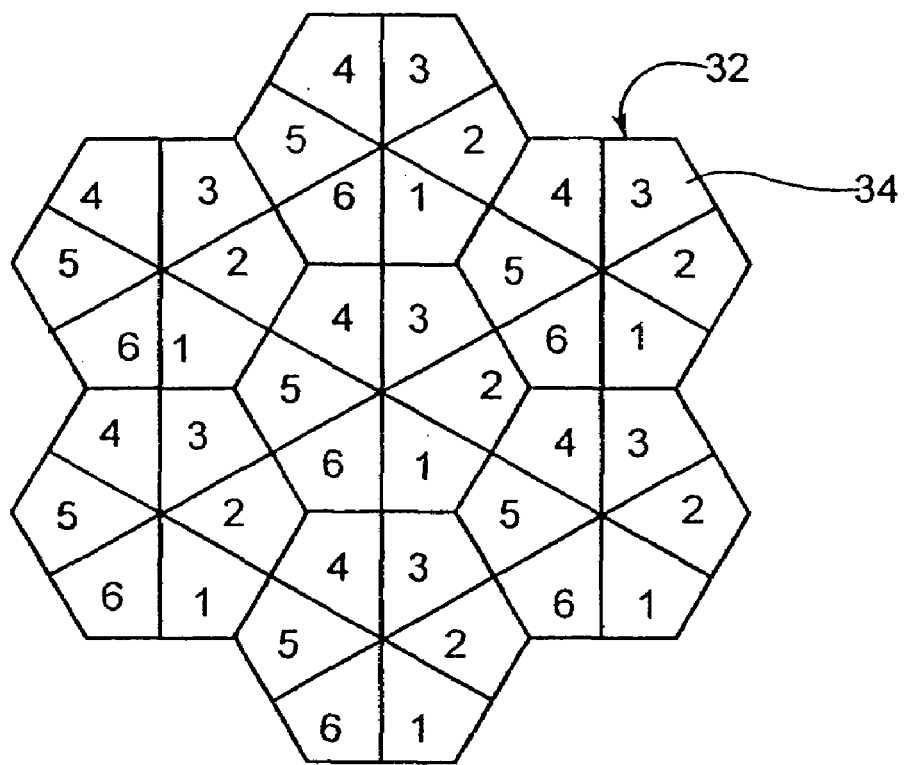
FIG. 7 depicts the preferred cellular re-use pattern of the present invention.

Prior art wireless systems generally require at least one ring of cells of separation for reuse of a frequency. For example, refer to prior art FIG. 5 wherein there are three frequencies being used within cells 32, as indicated by the three different shadings. In the configuration of FIG. 5, the cellular system operates to separate each cell that shares the same channel set by at least one cell 32 in order to minimize interference while letting the same frequencies be used in another part of the system. In another prior art, wireless system time division multiple access (TDMA) is used to diminish frequency interference among cells. For example, refer to prior art FIG. 6 where each cell 32 is divided into sectors 34, each sector 34 having its own frequency channel, the channels being repeated in the next proximate cell 32. To enable this frequency reuse, TDMA is used to give each user a unique time slot within the channel. As such, in the bottom cell 32, sector 1, a user transmits according to the indicated stepped time signal, in the adjacent right cell 32, a user transmits according to the indicated stepped time signal, i.e., after the bottom cell 32 transmits, and in the adjacent top cell 32, a user transmits according to the indicated stepped time signal, i.e., after the adjacent right cell 32 transmits, and so on, so that each sector 1 in each cell transmits at a different time. However, according to the present invention through the use of quadrature phase-shift keying (QPSK) and the decreased diameter of each cell, described further below, neither a separation of cells 32 nor inter-cell TDMA is required, see FIG. 7.

In alternative embodiments of the present invention, each cell 32 may be provided with three sectors 34 whereby the time division multiplex method used within that cell is based on a two cell pattern (six sectors). When the two cell pattern is provided with a single 6 MHz channel, transmission occurs one-sixth of the time in each sector, when the two cell pattern is provided with two 6 MHz channels, transmission occurs one-third of the time in each sector and, when the two cell pattern is provided with three 6 Mhz channels, transmission occurs one-half the time. Changing cell and sector patterns, of course, has an affect on transmission rates, data throughput rates, and the number of users that may be supported by system 10. However, the ability to time share, e.g., 1:1, 1:2, 1:3, 1:4, 1:6, etc., allows deployment of a system 10 with a low number of frequencies for a given area to be covered. It should be noted that other cell, sector and channel configurations may be used within system 10 without departing from the spirit or scope of the invention. However, it should also be noted that increasing the number of sectors increases the overall cost of base station unit 18 by increasing the number of separate antennas that are then required for each base station unit 18.

Regardless of the exact cellular layout and intra-cell time division multiplex duty cycle, each sector 34 preferably uses its provided channel for data packet transmissions for increments of times called frames. System 10 preferably uses time division duplex (TDD) to support two-way communication in each sector 34. Each frame is divided into two main parts, a downlink transmission time and an uplink transmission time. The downlink transmission time preferably allows for base unit 18 to transmit in one of a plurality of downlink channel slots 100, see FIG. 8. Likewise, the uplink transmission time preferably allows for CPE units 14 to transmit in one of a plurality of uplink channel slots 102. There is preferably a variable ratio of downlink channel slots 100 to uplink channel slots 102 to allow for adaptation of system data throughput rates of the given type of communication traffic. The ratio is a preferably a configurable parameter but may be changed during operation without departing from the spirit or scope of the invention.

Each downlink and uplink channel slot preferably contains the transmission of a single OFDM signal that contains a packet of data (OFDM is preferred to digital spread spectrum as digital spread spectrum does not provide enough power for each symbol that is transmitted over the entire frequency; increasing the power to support for longer transmission distances results in a splattering of the power of the signal beyond the assigned bandwidth). The timing of total frame duration is preferably configurable to a preferred standard time length. However, the duration of each frame may vary in length from one frame to the next and may vary between cells and sectors. Note that to provide signaling and a time/frequency reference for uplink operation, the downlink of a given sector 34 preferably transmits for the duration of the downlink transmission time, even if there is no data to be sent on the downlink for a given frame or portion of a frame.

Figure 8:
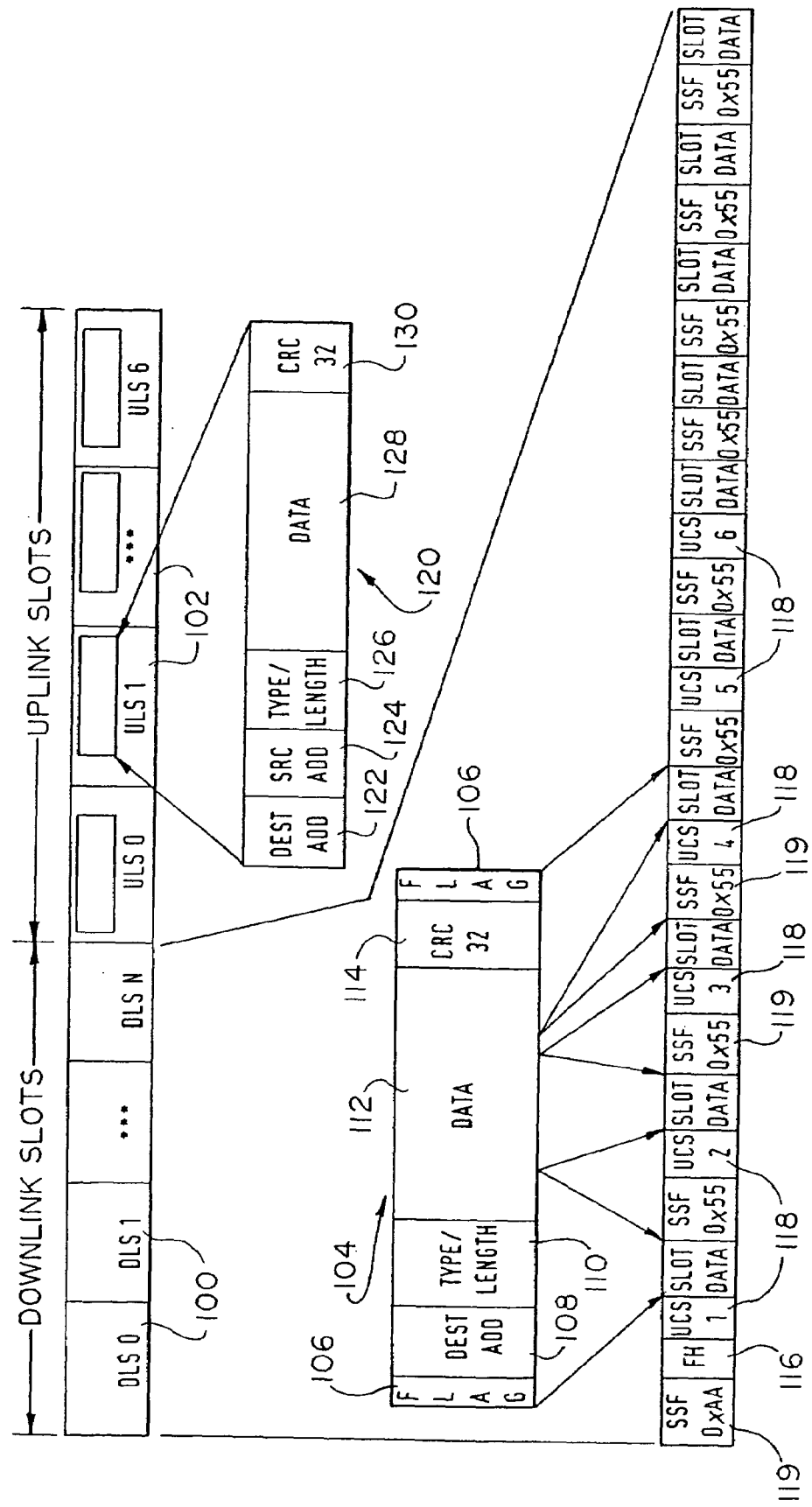
FIG. 8 depicts the layout of the uplink and downlink transmission slots used with the system of the present invention as well as the layout of the message packets contained within the slots.
Figure 9A:
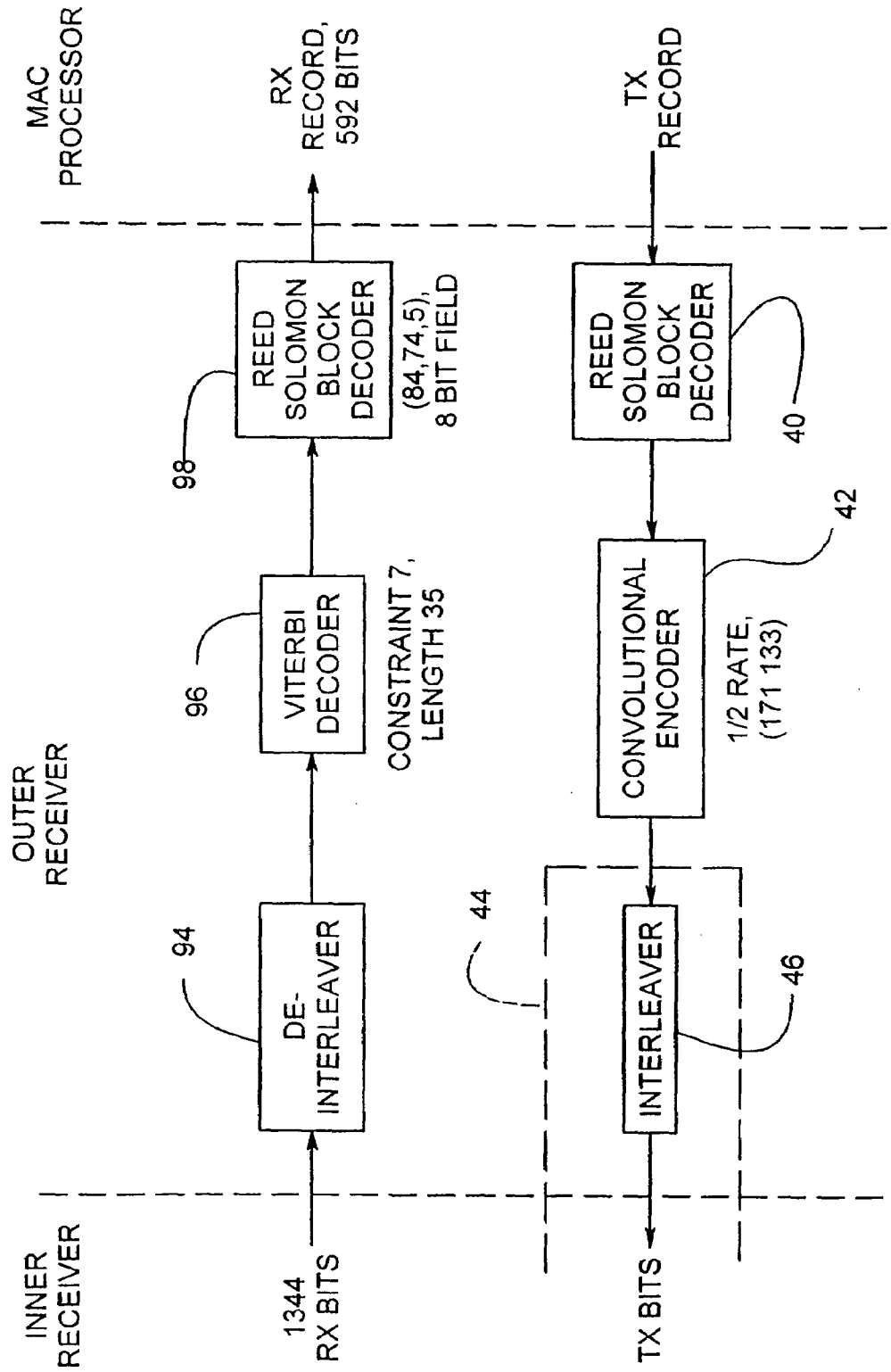
Figure 9B:
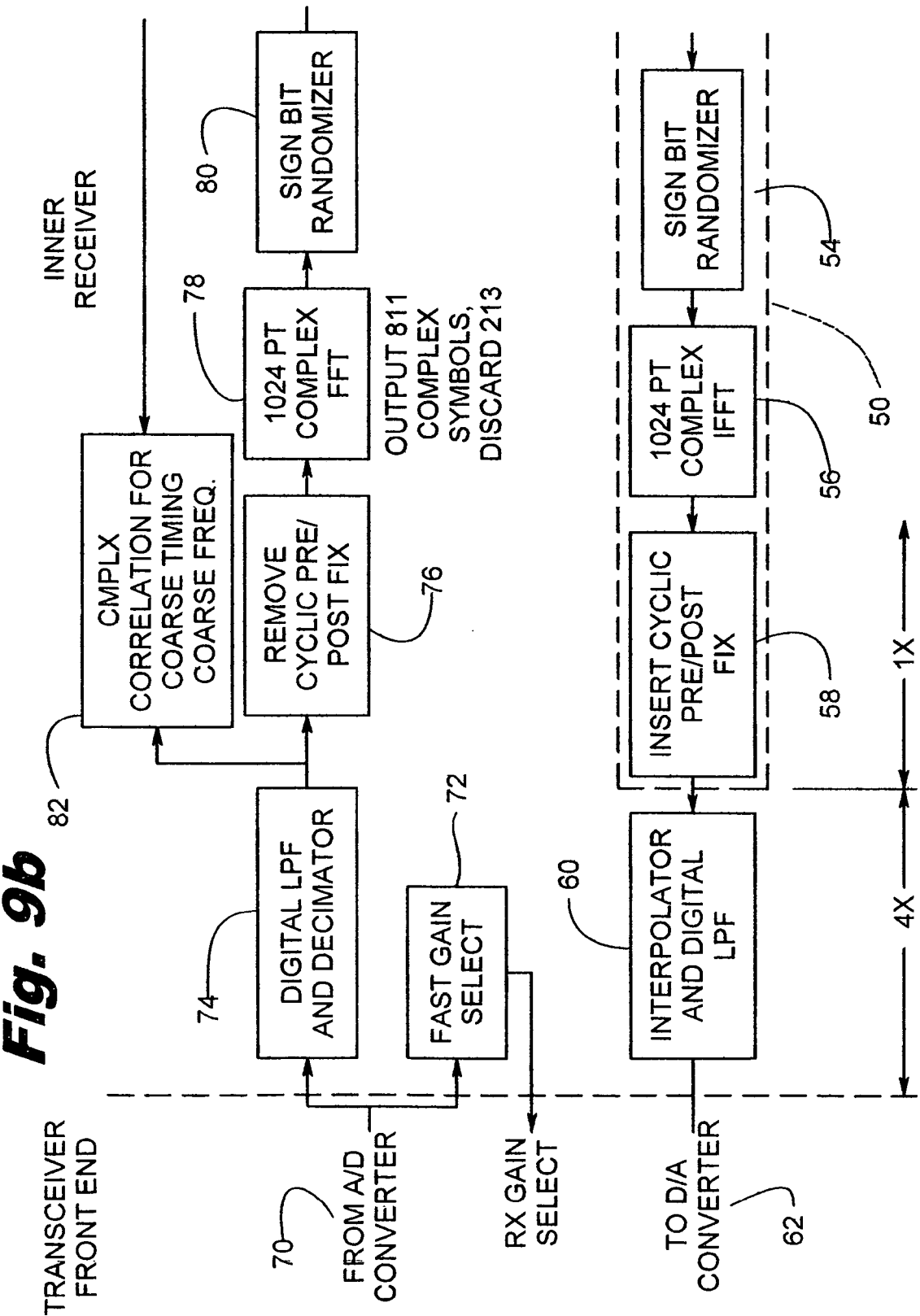

Referring to FIG. 8, each downlink transmission preferably contains a downlink message packet 104, comprising a continuous byte stream that has been generated by host computer 12 or network 19. Each byte stream begins and ends with a flag 106, e.g., 1 or 2 bytes, to mark the beginning and ending of the message packet. In between flags 106, each byte stream preferably includes a 4 byte destination address 108, a 2 byte length/type field 110, up to 2 k of data bytes 112, and a 4 byte cyclic redundancy code (CRC) 114, which covers the address field 108, the length/type field 110, and the data 112.

Additionally, the downlink transmission portion is framed using an air link MAC protocol and preferably contains a frame header field (FH) 116 and a plurality of uplink channel status fields (UCS) 118, the UCS fields 118 appearing at intervals of one downlink slot time in the downlink transmission. In addition, each downlink OFDM symbol begins with an eight-bit symbol sequence flag (SSF) 119, which indicates if a downlink symbol contains a frame header field 116. As such, each OFDM symbol contains a packet of data and detection aiding information sufficient to demodulate the symbol; distinct OFDM symbols containing known, fixed information for training, i.e., data that is embedded in the symbol to allow the receiver to acquire and lock on to a transmission, is not utilized.

Frame header field 116 contains the over-the-air address of base station unit 18 and other information that is specific to the given base station unit 18 for overall operation of base station unit and CPE unit(s) 14 that are using the given base station unit 18. The preferred configuration of frame header field 116 provides for a total of eight bytes including: (1) several flags (1 bit each) for the start of a super-frame, the end of a super-frame, and idle symbol; (2) system identifier, 4 bits; (3) transmit power level, 4 bits; (4) sector/cell base station unit address, 4 bytes; (5) a bias number indicating the number of OFDM symbols in the downlink portion of the frame, 4 bits; (6) time division multiplexing re-use factor (e.g., 1:1, 1:2, 1:3, etc), 4 bits; and (7) cyclic redundancy code (CRC), 1 byte.

Uplink channel status (UCS) field 118 contains information about whether an uplink channel slot 102 is being used. As such, there is a UCS field 118 in each of the first "n" downlink OFDM symbols, where "n" is the number of uplink slots in the frame. If slot 102 is being used, the UCS 118 contains: (1) the over-the-air address of CPE unit 14 that is using the specific uplink channel slot 102; (2) whether uplink channel slot 102 is reserved, and for which CPE unit 14; and (3) other pertinent information for control of the given uplink channel slot 102. A preferred configuration of UCS field 118 provides for a total of six bytes including: (1) mobile address, 4 bytes; (2) slot in use, 1 bit; (3) Ack, 1 bit; (4) preempt, 1 bit; (5) reserved, 2 bits; (6) Quality of Service (QoS), 3 bits; and (7) cyclic redundancy code (CRC), 1 byte.

The mobile address of UCS field 118 generally refers to the CPE unit 14 that used the given slot 102 in the preceding frame. However, it may refer to a CPE unit 14 that will use slot 102 in the uplink transmit portion of the current/next frame but may not have used slot 102 previously. "Slot in use" refers to whether the given slot 102 will be available for random access in the CPE unit 14 transmit portion of the current frame. "Ack" refers to the results of the uplink transmission in the given slot 102 in the preceding frame. A CPE unit 14 must retransmit any incorrect block before transmitting a new block. "Preempt" means slot 102 is reserved for a "new" CPE unit 14 in the CPE unit transmit portion of the next frame. The "reserve" bits are not used. "Quality of Service" (QoS) refers to priority of slot 102 in the CPE unit transmit portion of the current frame, i.e., only users of specified or higher priority will be allowed to transmit random access bursts in the given slot 102 in the uplink transmit portion of the current frame. The CRC is the same polynomial that is used in the frame header field 116 and covers all of the other fields in the UCS field 118.

The downlink provides media access control (MAC) by CPE unit(s) 14 for transmission on the uplink via UCS field 118. The MAC provided by the downlink preferably uses airlink MAC protocol. This MAC preferably acts as a slotted-aloha media access, providing users with on demand access to the airlink between CPE unit 14 and base station unit 18, with implicit additional slot reservation for extended message transmission from a CPE unit 14. Quality of service (QoS) is preferably provided in UCS fields 118 to control the services that are allowed access.

Figure 9:
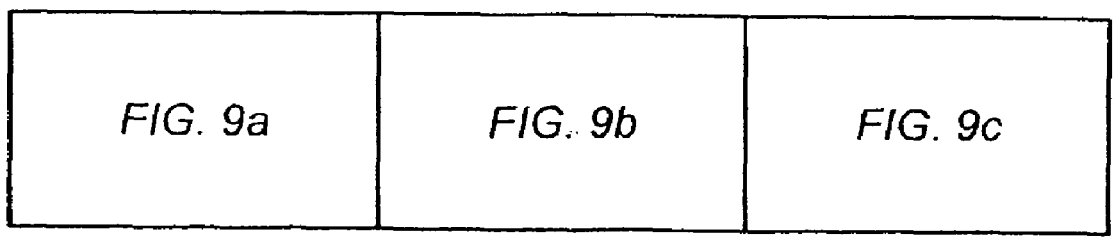
FIG. 9 and associated

The byte stream is conditioned for transmission by CPE unit 14 or base station unit 18 per the lower level of the block diagram in FIG. 9. As shown, the byte stream is first subjected to forward error correction coding, as provided by a Reed/Solomon block encoder 40, and a convolutional encoder 42.

Reed/Solomon block encoder 40 operates to add bytes of Reed/Solomon parity, e.g., ten bytes of parity, to the byte stream in which a certain number of byte errors, e.g., five byte errors, can be corrected. After Reed/Solomon block encoder 40, the byte stream is applied in serial bit stream fashion to convolution encoder 42. Convolutional encoder 42 is preferably a half-rate convolutional encoder that operates to add redundancy to the bit stream. Note the Reed/Solomon code word is preferably input to convolutional encoder 42 with a constraint length of 7, a depth of 35, and a code rate of 0.5. Of course, other constraint lengths and code rates may be used without departing from the spirit or scope of the invention.

In the preferred embodiment, the byte stream is coded with the Reed/Solomon block encoder 40 and 1/2-rate convolutional encoder 42 to use 672 carriers. More specifically, these 672 carriers, which carry data information, are modulated with two bits providing 1344 bits of data that are transmitted per symbol. These 1344 bits of data are 1/2-rate convolutional encoded for random errors leaving 672 bits of data when received and convolution decoded by the receiver. The 672 bits comprise 84 bytes of data that are separated into 74 bytes of payload data to be transferred and 10 bytes of error correction using Reed/Solomon encoding. When the 84 bytes of data are received, Reed/Solomon decoding error correction is performed (as described below) to correct up to five bytes of data that may be in error, which corrects for burst errors that are received.

The bit stream leaving convolutional encoder 42 is provided to a signal mapper 44 which is preferably comprised of interleaver block 46 and "bits to QPSK symbols" block 48. Signal mapper 44 operates to interleave the output bits from convolutional encoder with a specific span and depth, e.g., 32 and 42, respectively. The bit values of 1/0 are then coded to −1/1 and unmodulated dibits, e.g., three unmodulated dibits (0,0), are then inserted at the center of the bit sequence to form a total sequence of 675 information dibits, each of which modulates a quadrature phase-shift keying (QPSK) subsymbol. The nulling out, or not modulating, of the center three carriers removes the need to preserve DC and low frequency content in the modulated signal, which ease the design constraints and implementation of a transmitter and receiver.

The use of QPSK modulation on the information carriers allows for an optimized cellular system. More specifically, the use of QPSK modulation on the carriers provides for an optimum carrier-to-interference ratio for a given data throughput rate. This optimum carrier-to-interference ratio allows for a cellular style of deployment that uses a 1:1 frequency reuse pattern. This allows each cell to use the same six frequencies in a six-sectored cell. Higher orders of modulation require a larger carrier-to-interference ratio therefore requiring more, i.e., three times or more, frequencies than a QPSK modulated system.

Figure 10:
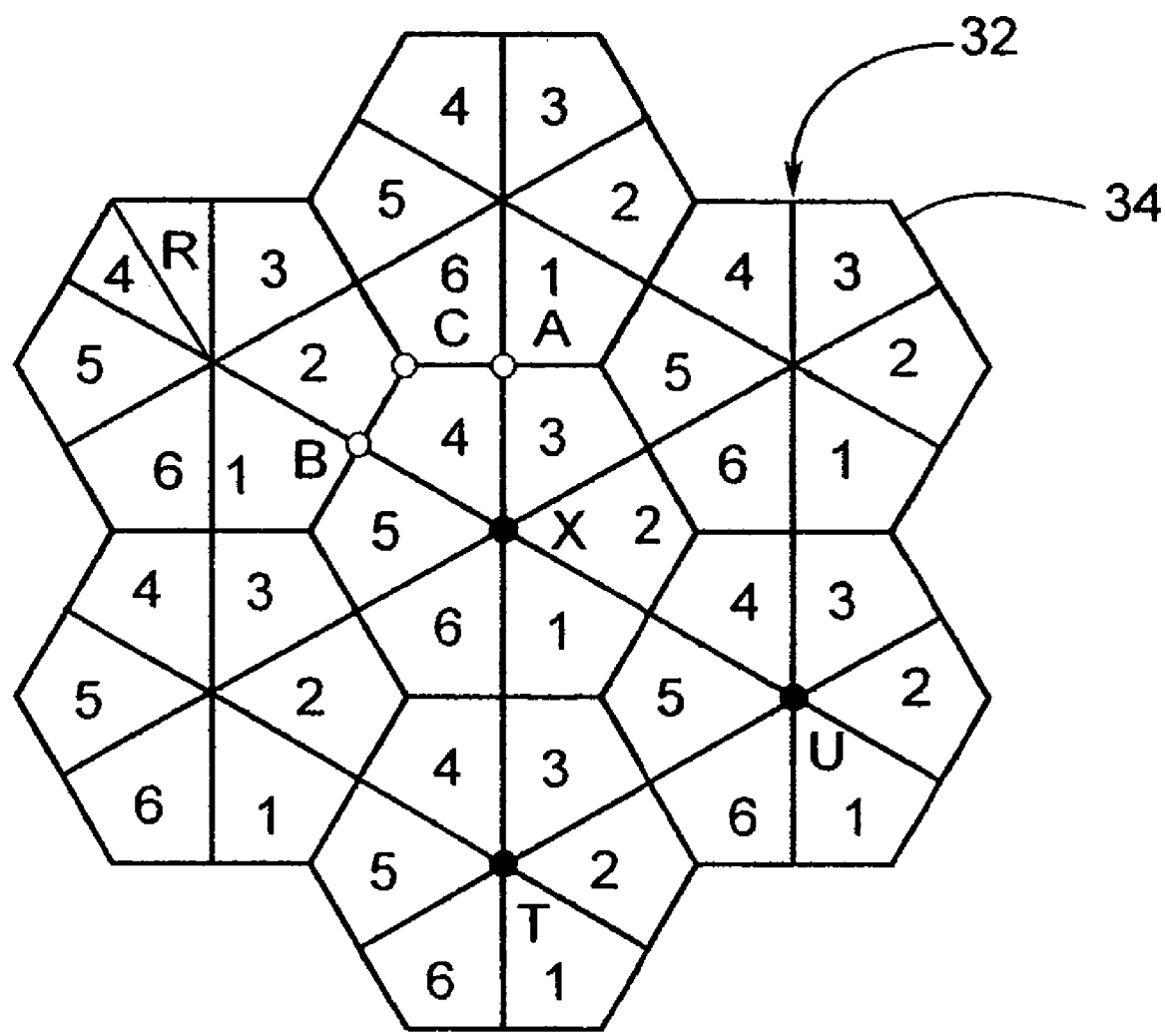
FIG. 10. is a diagram illustrating interference for a 1:1 repeating pattern of a cell that has six 60° sectors with a 30° offset.

To further explain, reference is made to FIG. 10 which is a diagram that shows the interference for a 1:1 repeating pattern of a cell that has six 60° sectors with a 30° offset, wherein the distance of 1 is referenced to a vertex of a sector, R. In this diagram, site X is the main transmitting site. The subscribers that would be interfered with are A, B, and C. The sites that would interfere would be T and U. The cells below and to the right of T and U would also add to the interference but to a much lesser degree than T and U. The levels of interference then, are as follows $\left(A\frac{1}{R^4}\right.$ propagation loss factor is used for the following analysis$\left.\right)$:

1. "A" would be interfered by T and U. The level of interference is approximately −14.84 dB.
2. "B" would be interfered by T and U. The level of interference is approximately −14.84 dB.
3. "C" would be interfered by T and U. The level of interference is approximately −13.9 dB.

An additional 2 to 4 dB of protection is available when the radiating patterns of the directional antennas are taken into account.

The signaling of OFDM using QPSK requires only 5 dB of SNR (signal-to-noise ratio) protection to achieve a $10^{-6}$ bit error rate (BER). The six sector cell provides at least an additional 8 dB of interference protection. Higher order modulations require a higher SNR compared to QPSK for the same symbol error rate. The following table shows the level of modulation and the additional protection required for the higher level modulations relative to QPSK.

| Modulation | Bits/sec/Hz | Transmission Rate | Added Protection Required | Reuse | Eff |
|---|---|---|---|---|---|
| BPSK | 1 | 2.5 Mbps | 0.0 dB | 1:1 | 0.50 |
| QPSK | 2 | 5 Mbps | 0.0 dB | 1:1 | 1.00 |
| 16 QAM | 4 | 10 Mbps | 7.0 dB | 3:1 | 0.66 |
| 64 QAM | 6 | 15 Mbps | 13.2 dB | 5:1 | 0.60 |
| 256 QAM | 8 | 20 Mbps | 19.3 dB | 7:1 | 0.57 |

The transmission rate is an example of a transmission rate for comparison between the modulations. The added protection is the additional amount of SNR required for the higher modulation to achieve the same symbol rate error as the QPSK. This added protection holds true for the interference from co-channel sites. The added protection levels that are required are close or exceed the available margin from a six sector 1:1 cellular pattern as described previously. The reuse factor is the number of channel sets that are required to create a reuse pattern that is capable of providing the required protection. The rule of thumb is that for every doubling of order of modulation, there is an increase of 3 dB needed for additional protection. This increase of 3 dB in power translates into an increase in propagation distance that results in the inability to achieve a one-to-one frequency reuse ratio between adjacent cells.

An efficiency factor can then be calculated as bits/sec/Hz/area relative to the QPSK. The present invention maximizes this efficiency factor to create a highly efficient cellular system for a fixed OFDM wireless MAN. The present invention recognizes that the higher order modulations have a lower efficiency factor when an entire cellular network is considered. Therefore QPSK is the optimum modulation for a cellularized system that uses a minimal amount of spectrum over a given area in a cellular network. It should also be noted that the higher order modulations require signal levels for higher fading margins due to multi-path conditions.

Next, continuing with the signal conditioning discussion and referring once again to FIG. 9, modulation, preferably orthogonal frequency division modulation (OFDM) 50, is performed on the QPSK subsymbols exiting signal mapper 44. OFDM 50, as indicated in FIG. 9, preferably includes the following steps. First, pilot subsymbols are inserted with modulating dibit value (1,1) evenly among the information dibits, unmodulated guard subsymbols are inserted at the top and bottom of the 6 MHz channel, and out-of-band subsymbols are added to make a desired total sequence length of subsymbols, e.g., 1024 subsymbols, per OFDM symbol, see block 52. Next, a sign bit randomizer is applied to the subsymbols, see block 54. More specifically, the sequence of subsymbols is preferably multiplied by a pseudorandom noise (PRN) sequence to eliminate amplitude spikes due to the nonrandom nature of the data+pilot+guard+out-of-band subsymbols.

The next step in OFDM preferably comprises performing an inverse fast-Fourier transform on the now randomized subsymbol sequence, see block 56. After completion of the transform, a cyclic prefix/postfix is inserted at the start of the downlink symbol, see block 58. With modulation now complete, the digital sequence is preferably submitted to a low pass filter and, if necessary, interpolated to higher frequency rate prior to input to a digital-to-analog converter, see block 60. Finally, the sequence is submitted to a digital-to-analog converter 62 and transmitted from CPE unit 14 or base station unit 18 via analog radio circuitry.

OFDM operates, at least in part, to combat the effects, e.g., constructive and destructive interference, and phase shifting of the signal, of multipath. Multipath is a propagation phenomenon that results in radio signals reaching a receiving antenna by two or more paths.

Referring once again to FIG. 8, each uplink transmission preferably contains an uplink message packet 120, comprising a continuous byte stream that has been generated by a computer 12 or network 19. Each byte stream preferably includes a 4 byte destination address 122, a 4 byte source address 124, a 2 byte length/type field 126, 60 data bytes 128, and a 32 bit cyclic redundancy code (CRC) 130, which covers both address fields 122 and 124, the length/type field 126, and the data 128. Note that with an uplink transmission, message packet 120 is not framed, as with the downlink transmission, however, a fixed number, e.g., six, of uplink channel slots 102 are expected. System 10 may be configured to allow for any given CPE unit 14 to transmit in only one uplink channel slot 102 of a given frame. However, system 10 may alternatively be configured to enable a plurality of uplink messages from a single CPE unit 14 to be processed simultaneously, up to the number of uplink slots 102 per frame. Thus, subject to control by the MAC layer, an individual CPE unit 14 can increase its uplink throughput by using two or more uplink slots 102 in each frame if desired, up to the total number of uplink slots 102 in the frame.

The byte stream is conditioned for reception by CPE unit 14 or base station unit 18 per the upper level of the block diagram in FIG. 9. As indicated, an analog signal is received by CPE unit 14 or base station unit 18 via analog radio circuitry. The analog signal is then submitted to an analog-to-digital converter 70. The output of analog-to-digital converter is sampled and provided as feedback within an automatic gain control loop so that the analog-to-digital converter is maintained in a linear operating range, see block 72. The output of analog-to-digital converter is also submitted to "digital LPF and decimator" block 74 whereby the digital output is shifted into DSP preferably using field programmable gate array (FPGA) or application specific integrated circuit (ASIC) technology, and low pass filtered. The signal is now in the form of an OFDM symbol.

Operating on the OFDM symbol, the next step in completing reception is to remove the cyclic prefix and postfix from the OFDM symbol, see block 76. A fast-Fourier transform is then performed on the received OFDM symbol, see block 78.

A sign bit de-randomizer is then implemented, see block 80. Coarse timing/coarse frequency and fine timing/fine frequency of the OFDM symbol are provided by blocks 82 and 84, respectively.

Coarse timing is preferably achieved by correlating the cyclical prefix of a given OFDM symbol with the content of the symbol. More specifically, the cyclical prefix, which is a repetition of a portion of the symbol, allows the receiver to perform an auto-correlation function to determine where the start of a symbol is in time within several samples. The receiver is capable of symbol-by-symbol detection once the coarse timing has been acquired by observing several symbols (these symbols are not required to be fixed data content, training symbols). Coarse frequency is preferably acquired by pilot correlation. More specifically, the receiver performs an auto-correlation in the frequency domain based on the pilots to determine the frequency of the receiver carrier.

Fine timing of the OFDM symbol is preferably achieved by evaluating the phase of the pilots. The pilots are transmitted at a known phase thereby allowing the receiver to use this known information to determine where the start of a symbol is precisely, to better than a fractional portion of a sample. Fine frequency of the OFDM symbol is preferably acquired from the cyclical prefix. The cyclical prefix is used to tune the frequency of the carrier precisely to the carrier of the transmitter. Once the receiver has acquired coarse timing and fine frequency, then each OFDM symbol is adjusted for fine timing and coarse frequency enabling improved symbol detection, improved sensitivity reception, and improved error performance by the receiver.

The OFDM symbol is next submitted for demodulation which includes channel equalization via pilot processing, see block 86. With the OFDM signal now demodulated, the pilot, guard, and out-of-band subsymbols are extracted leaving a total sequence of information dibits, each of which modulated a quadrature phase-shift keying (QPSK) subsymbol, see block 88. The QPSK symbols are then preferably submitted to a signal de-mapper 90, which comprises block 92, wherein the QPSK symbols are returned to bit values of 1/0, and block 94, wherein the bits are de-interleaved. Signal de-mapper 90 effectively operates to place the bits in the same order as the originating signal to be transmitted. The output of signal de-mapper 90 is a serial bit data stream that is preferably submitted to a Viterbi decoder 96 wherein the bit rate of the serial bit data stream is reduced by one-half to correct errors. The output of the Viterbi decoder 96 is then preferably submitted to a Reed/Solomon block decoder 98 which operates to correct residual errors in the submitted data stream.

The uplink data stream is then submitted to a cyclic redundancy code (CRC) check in the base station unit 18. The CRC check is a technique for error detection in data communications that is used to assure a data packet has been accurately transferred. The CRC is the result of a calculation on the set of transmitted bits that the transmitter, e.g., CPE unit 14, appended to the data packet, as described earlier with respect to the uplink transmission. At the receiver, e.g., base station unit 18, the calculation is repeated and the results are compared to the encoded value. The calculations are chosen to optimize error detection. If the CRC check is good, the data packet is processed. If the CRC check is bad, then the data packet is rejected from further processing, as if the packet was not received at all by the base station unit 18.

In view of the above, it can be seen that fixed wireless access system 10 of the present invention is able to provide multichannel multipoint distribution service (MMDS) operators maximum throughput and user capacity per spectrum allocated with easy network deployment on both the base station and customer sides. More specifically, system 10 can support a higher effective throughput, which is defined as customer density times data throughput rate per customer, than other existing wireless systems. With respect to the customer side, CPE unit 14 is completely user-installable by use of a simple Ethernet connector and requires no registration with the FCC. Further, the cellularized and sectorized structure of the base station unit 18 design allows for complete frequency re-use of the allocated channel set which enables ease of network planning, and the ability to vary cell sizes consistent with the density of subscribers, i.e., high customer density is preferably addressed with a plurality of adjacent smaller cells 32 as opposed to a single larger cell.

With respect to a retail implementation of fixed wireless access system 10 the following preferably occurs: (1) a potential end user of system 10 goes to a retail electronic store to purchase CPE unit 14; (2) the end user is provided by the retailer with a contract for the service provider in the area that is providing fixed wireless access system 10; (3) the end user contacts the service provider and supplies the service provider with the information necessary to allow the service provider to enable the end user's specific CPE unit 14; and (4) the end user installs CPE unit 14 utilizing its internal antenna, as previously described, allowing interaction with system 10. The service provider is not required to send service personnel to the end user's premise to install CPE unit 14. Of course, other manners of retail implementation may be used without departing from the spirit or scope of the invention.

Applications of fixed wireless access system 10 include, but are not limited to: (1) high-speed data applications, e.g., Internet access (DSL speeds), remote access e-mail hosting, WAN/LAN extension, remote MIS support services; (2) telephony, e.g., Internet telephony, voice over Internet Protocol (VoIP); and (3) video, e.g. video conferencing, video streaming, remote video camera surveillance, distance learning, telemedicine.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A method of establishing communication between a consumer premise equipment (CPE) unit and a plurality of base station units, comprising the steps of:
   user-installing the CPE unit to a host external to the CPE and located within a premise, wherein the CPE unit is completely contained within the premise, wherein user-installing comprises coupling the CPE to the host and wherein the CPE provides a wireless link between the host and the plurality of base stations;
   automatically registering, by the CPE with one of the plurality of base station units, by radio frequency communication upon the CPE unit being user-installed; and
   authenticating the CPE unit, wherein authentication comprises determining a number of hosts that may attach to the CPE unit.

2. The method of claim 1 wherein the step of registering is based upon a quality of signal emitted by the base station unit.

3. The method of claim 1, further comprising the one base station unit determining whether the registration of the CPE unit is allowed with the one base station unit.

4. The method of claim 3, further comprising the one base station unit denying or acknowledging the CPE unit.

5. The method of claim 1 wherein the CPE unit is connected to a plurality of hosts and wherein upon the CPE unit registering with one of the plurality of base station units, the CPE unit passes the addresses of those hosts connected to the CPE unit to the one base station unit.

6. The method of claim 5 wherein the host is selected from a group comprising a single-host computer and a network of a plurality of host computers.

7. The method of claim 6 wherein the CPE unit is connected to the plurality of hosts via an Ethernet connection.

8. The method of claim 1 wherein the radio frequency communication is under 10 GHz.

9. The method of claim 5 further comprising creating, by the one base station unit, a table of addresses of the hosts based on the addresses received from the CPE unit.

10. A method for establishing a fixed wireless system comprising:
    purchasing a consumer premise equipment (CPE) unit from a retailer;
    obtaining a contract for a service provider upon purchasing the CPE unit;
    contracting the service provider to provide information about the purchased CPE unit;
    user-installing the CPE unit, wherein user-installing comprises coupling the CPE to a host and wherein the CPE provides a wireless link between the host and a plurality of base stations previously established in the fixed wireless system;
    automatically registering, by the CPE unit with a selected one of a the plurality of base station units, by radio frequency communication upon the CPE unit being user-installed; and
    authenticating the CPE unit, wherein authentication comprises determining a number of hosts that may attach to the CPE unit.

11. The method of claim 10 wherein the step of registering comprises detecting a signal emitted by at least one of the plurality of base station units and wherein the selected base station unit is selected based at least in part upon a quality of signal detected by the CPE unit.

12. The method of claim 10, further comprising the selected base station unit determining whether the registration of the CPE unit is allowed with the selected base station unit.

13. The method of claim 12, further comprising the selected base station unit denying or acknowledging the CPE unit.

14. The method of claim 10 wherein the CPE unit is connected to a plurality of hosts and wherein upon the CPE unit registering with the selected base station unit, the CPE unit passes the addresses of those hosts connected to the CPE unit to the selected base station unit.

15. The method of claim 14 wherein the host is selected from a group of hosts comprising a single-host computer and a network of a plurality of host computers.

16. The method of claim 15 wherein the CPE unit is connected to the plurality of hosts via an Ethernet connection.

17. The method of claim 10 wherein the radio frequency communication is under 10 GHz.

18. The method of claim 14 further comprising creating, by the one base station unit, a table of addresses of the hosts based on the addresses received from the CPE unit.

* * * * *